(12) United States Patent
Onodera et al.

(10) Patent No.: US 11,299,367 B2
(45) Date of Patent: Apr. 12, 2022

(54) ADJUSTMENT DEVICE FOR FRICTION ADJUSTMENT PORTION OF SECTION

(71) Applicant: The Yokohama Rubber Co., LTD., Tokyo (JP)

(72) Inventors: Akira Onodera, Hiratsuka (JP); Takayuki Saito, Hiratsuka (JP); Kenji Ueda, Omitama (JP); Masahiro Ebisawa, Omitama (JP)

(73) Assignee: The Yokohama Rubber Co., LTD.

( * ) Notice: Subject to any disclaimer, the term of this patent is extended or adjusted under 35 U.S.C. 154(b) by 189 days.

(21) Appl. No.: 16/753,256

(22) PCT Filed: Jun. 29, 2018

(86) PCT No.: PCT/JP2018/024961
§ 371 (c)(1),
(2) Date: Apr. 2, 2020

(87) PCT Pub. No.: WO2019/069515
PCT Pub. Date: Apr. 11, 2019

(65) Prior Publication Data
US 2020/0317463 A1     Oct. 8, 2020

(30) Foreign Application Priority Data
Oct. 2, 2017   (JP) .............................. JP2017-192921

(51) Int. Cl.
*B65H 59/04*      (2006.01)
*B29C 70/54*      (2006.01)
*B29C 70/32*      (2006.01)

(52) U.S. Cl.
CPC ........... *B65H 59/04* (2013.01); *B29C 70/545* (2013.01); *B29C 70/32* (2013.01); *B29C 70/543* (2013.01)

(58) Field of Classification Search
CPC ...... B65H 59/04; B65H 2701/36; D07B 3/02; D07B 3/022
See application file for complete search history.

(56) References Cited

FOREIGN PATENT DOCUMENTS

| | | |
|---|---|---|
| JP | H06-286941 | 10/1994 |
| JP | H10-044214 | 2/1998 |
| JP | H10-249954 | 9/1998 |
| JP | 2008-063703 | 3/2008 |
| JP | 2008-173449 | 7/2008 |

OTHER PUBLICATIONS

International Search Report for International Application No. PCT/JP2018/024961 dated Aug. 21, 2018, 2 pages, Japan.

*Primary Examiner* — William E Dondero
(74) *Attorney, Agent, or Firm* — Thorpe North & Western

(57) ABSTRACT

In an adjustment device for a frictional force adjustment portion in a section, an inner circumferential portion of the section includes: a support hole formed from rolling bearings at both ends; a frictional force generation portion configured of a brake shoe, a coil spring, and a hexagon socket set screw and generates a frictional force against a rotary shaft inserted into the support hole; and a frictional force adjustment portion configured of the hexagon socket set screw and adjusts the frictional force in the frictional force generation portion. The adjustment member driving actuator adjusts the frictional force of the frictional force adjustment portion by rotating normally and reversely the adjustment member such that the frictional force in the frictional force generation portion of the section falls within a predetermined range.

11 Claims, 10 Drawing Sheets

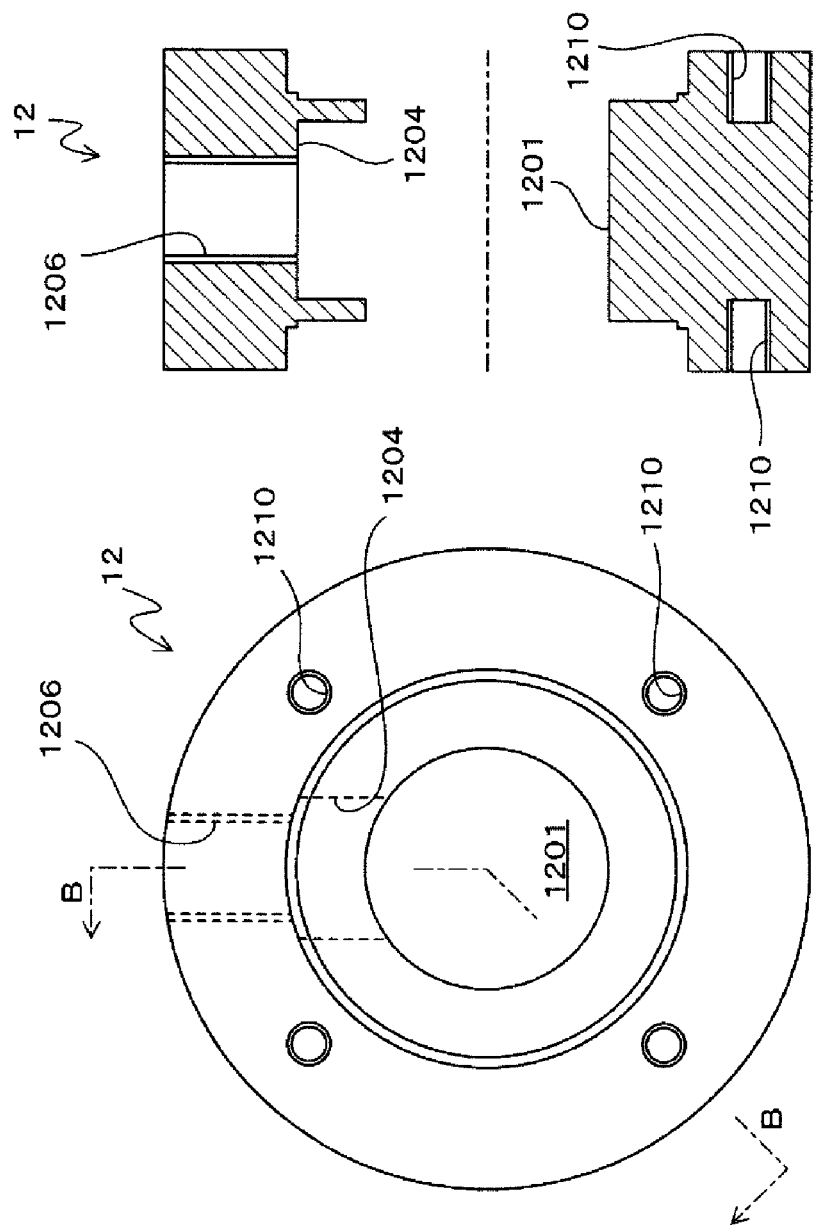

ADJUSTMENT DEVICE FOR FRICTION ADJUSTMENT PORTION OF SECTION

TECHNICAL FIELD

The present technology relates to an adjustment device for a frictional force adjustment portion of a section.

BACKGROUND ART

Some rubber hoses such as a hydraulic hose include a reinforcing layer formed by spirally winding a reinforcing member such as a steel cord or the like.

A spiral machine is provided as a manufacturing device for such a reinforcing layer.

The spiral machine includes a plurality of face plates on which a plurality of bobbins is mounted, and each bobbin has a plurality of sections around which the steel cord is wound.

An opening that inserts a mandrel therethrough is provided at the center of each face plate, and a plurality of face plates is provided at intervals in the axial direction of the mandrel.

Then, the steel cords drawn from the sections of the bobbins are wound on a rubber layer of the mandrel while rotating the face plates to form the reinforcing layer.

Here, 18 to 30 bobbins are mounted on one face plate, and four or six face plates are commonly provided.

The number of units and bobbins in such a spiral machine depends on the specifications of the rubber hose, and the total number of bobbins used in one spiral machine is, for example, approximately 72 to 180. Thus, when one bobbin has five sections, the total number of sections used in one spiral machine would be 360 to 900.

In this case, in order to ensure the performance of the reinforcing layer, the tension of the steel cords dispensed from the bobbins of each unit need to be controlled to fall within a predetermined set value range for the specifications of each unit.

Thus, the inner circumferential portion of the section is provided with a support hole, a brake shoe pressed against a rotary shaft inserted into the support hole to generate a frictional force, and a frictional force adjustment portion that adjusts the frictional force in the brake shoe via a screw.

Then, the frictional force is adjusted by manually adjusting the rotation of the screw of the frictional force adjustment portion for each section, such that the tension of the steel cord dispensed from the section falls within the set value range.

Specifically, in the state where the rotation of the section is disabled, the rotary shaft is rotated by a motor, and a driving current of the motor is measured to detect a load torque of the motor. Then, the frictional force generated by the brake shoe is determined from the load torque, and the rotation of the screw of the frictional force adjustment portion is manually adjusted for each section such that the frictional force falls within the set value range.

However, as described above, for example, a manual adjustment operation is performed for each of 360 to 900 sections on a one-by-one basis according to specifications of the rubber hoses to be manufactured, which is time consuming. Therefore, there is a need for some improvement.

SUMMARY

The present technology provides an adjustment device for a frictional force adjustment portion of a section, which is advantageous for improving the efficiency of the adjustment operation.

The present technology provides an adjustment device for a frictional force adjustment portion in a section, the section including an inner circumferential portion provided with a support hole, a frictional force generation portion that generates a frictional force against a rotary shaft inserted through the support hole, and the frictional force adjustment portion that adjusts the frictional force in the frictional force generation portion, and an outer circumferential portion provided with a wire winding portion around which a wire is wound, the adjustment device including, a rotary shaft rotating actuator that rotates the rotary shaft, an adjustment member that is detachably coupled to the frictional force adjustment portion of the section supported by the rotary shaft and enables the frictional force adjustment portion to adjust the frictional force, an adjustment member driving actuator that drives the adjustment member in a direction of adjusting the frictional force, a support member that supports the adjustment member and the adjustment member driving actuator, a movement mechanism that moves the support member in a direction in which the support member is detachably coupled to the frictional force adjustment portion, a tilt tolerance mechanism that allows the support member to tilt due to rotation of the rotary shaft in a state where the adjustment member engages with the frictional force adjustment portion, a pressure detection portion that detects a pressure received from the support member at the tilting, a frictional force calculation unit that calculates the frictional force in the frictional force generation portion from the pressure detected by the pressure detection portion, and a frictional force control unit that controls the adjustment member driving actuator such that the frictional force calculated by the frictional force calculation unit falls within a predetermined range.

According to the present technology, since the adjustment member driving actuator is controlled such that the frictional force in the frictional force generation portion of the section falls within the predetermined range, the adjustment of the frictional force adjustment portion may be automatically performed in a short time.

Accordingly, the complicated a complicated manual adjustment operation of the adjustment member is unnecessary, thereby improving the efficiency of the adjustment of the frictional force adjustment portion, which is advantageous for reducing manufacturing costs of the hose.

BRIEF DESCRIPTION OF DRAWINGS

FIG. 5A is a side view illustrating a boss in a section, and FIG. 5B is a cross-sectional view taken along a line B-B in FIG. 5A.

DETAILED DESCRIPTION

First, sections used in an embodiment will be described.

Figure 4:
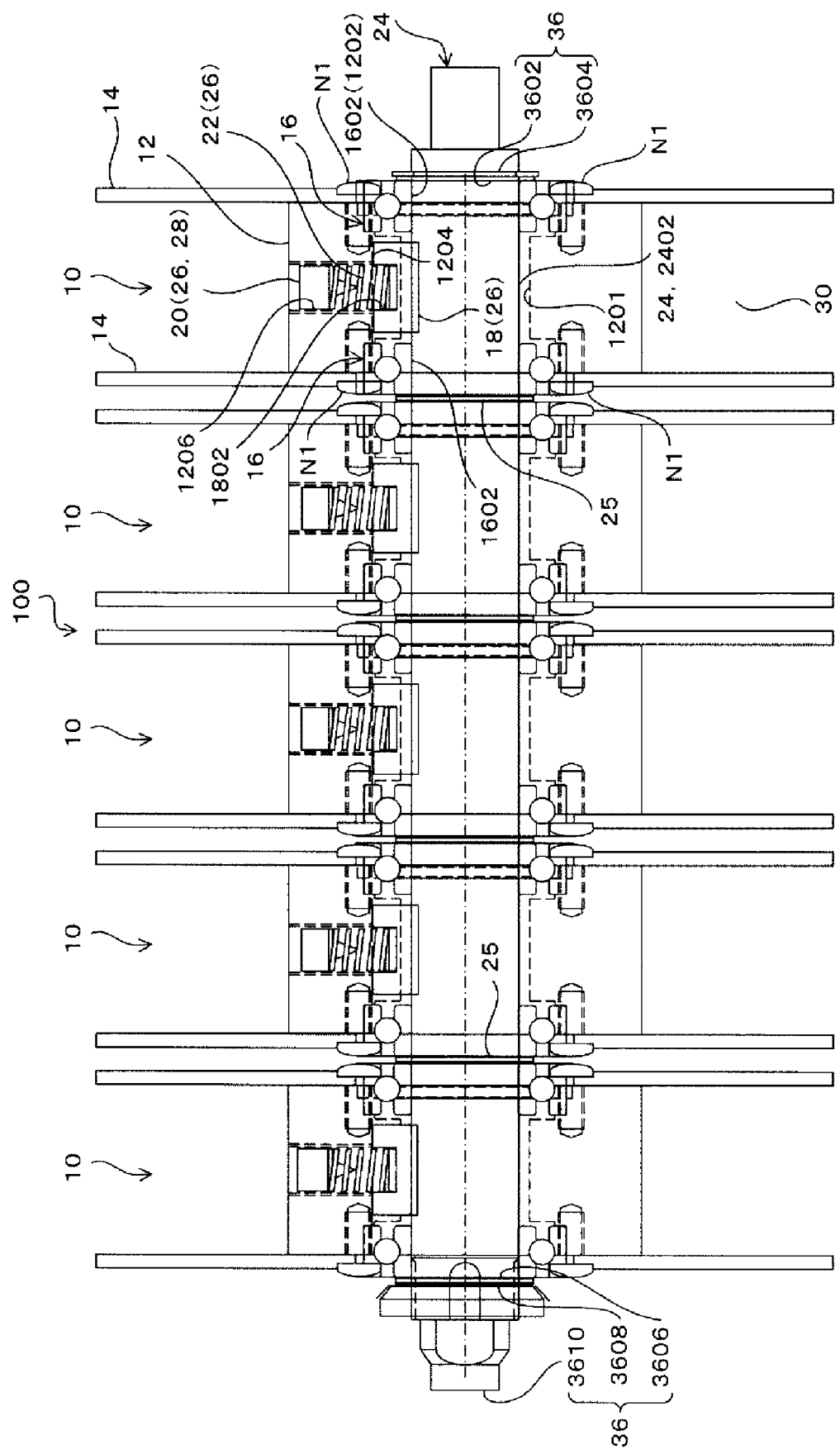
FIG. 4 is a plan view illustrating the configuration in which five sections are assembled to a rotary shaft to configure one bobbin.

As illustrated in FIG. 4, in the present embodiment, one bobbin 100 includes five sections 10 and a rotary shaft 24.

The sections 10 each includes a boss 12 having a support hole 1202 therethrough, and flanges 14 attached to both end surfaces of the boss 12 with screws N1.

As illustrated in FIG. 4 and FIG. 5, a through hole 1201 is formed at the center of the boss 12, rolling bearings 16 are attached to both ends of the through hole 1201, and inner circumferential surfaces of inner races 1602 of the rolling bearings 16 located at both ends constitute the support hole 1202.

A recess 1204 and a screw hole 1206 are formed in the central portion of the boss 12 in the longitudinal direction (the extending direction of the support hole 1202).

The opened recess 1204 is formed on the inner circumferential portion of the boss 12, and the screw hole 1206 penetrates from the outer circumferential surface of the boss 12 to the bottom surface of the recess 1204, and is opened at the center of the recess 1204.

A brake shoe 18 is accommodated in the recess 1204, a hexagon socket set screw (embedded screw) 20 with a hexagonal hole 2002 (see FIGS. 7A and 7B) is coupled to the screw hole 1206, and a coil spring 22 is disposed between the hexagon socket set screw 20 and the brake shoe 18.

Note that in FIG. 5, a reference sign 1210 denotes a screw hole coupled to the screw N1.

Figure 7A:
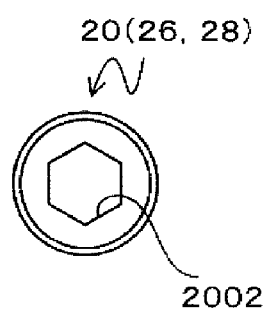
FIG. 7A is a plan view illustrating a hexagon socket set screw.
Figure 7B:
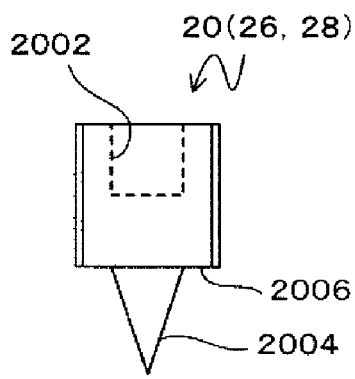
FIG. 7B is a front view illustrating the hexagon socket set screw.

As illustrated in FIGS. 7A and 7B, a protrusion 2004 is formed at the center of a tip of the hexagon socket set screw 20, and the protrusion 2004 is inserted inside the coil spring 22, thereby bringing an annular end surface 2006 around the protrusion 2004 into contact with the coil spring 22 to generate an elastic force of the coil spring 22 stably and reliably.

Figure 8A:
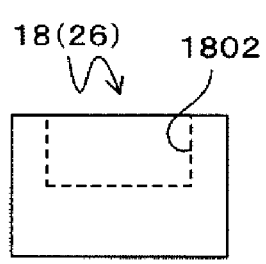
FIG. 8A is a front view illustrating a brake shoe.
Figure 8B:
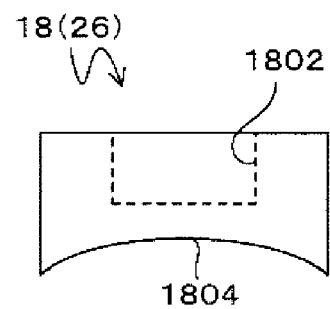
FIG. 8B is a side view illustrating the brake shoe.

As illustrated in FIGS. 8A and 8B, the tip of the coil spring 22 is inserted into a hole 1802 of the brake shoe 18, and is pressed against the bottom of the hole 1802 via a washer-like member (not illustrated) so as not to sink into the bottom of the hole 1802, and the washer-like member is adhered to the bottom of the hole 1802 with an adhesive.

A cylindrical surface 1804 corresponding to an outer circumferential surface 2402 of the rotary shaft 24 supported by the support hole 1202 forms an exposed area of the brake shoe 18 inside the through hole 1201.

Accordingly, a compression amount of the coil spring 22 is adjusted by rotating normally and reversely the hexagon socket set screw 20, thereby adjusting the pressing force of the brake shoe 18 against the outer circumferential surface 2402 of the rotary shaft 24.

Accordingly, each section 10 includes an inner circumferential portion provided with: the support hole 1202 formed from the rolling bearings 16 at both ends; a frictional force generation portion 26 that is configured of the brake shoe 18, the coil spring 22, and the hexagon socket set screw 20 and generates a frictional force against the rotary shaft 24 inserted into the support hole 1202; and a frictional force adjustment portion 28 that is configured of the hexagon socket set screw 20 and adjusts the frictional force in the frictional force generation portion 26, and also includes an outer circumferential portion provided with a wire winding portion 30 that is configured of the outer circumferential surface 2402 of the boss 12 and the flange 14 at both ends and around which a wire such as the steel cord is wound.

In other words, in the present embodiment, the frictional force generation portion 26 that generates a frictional force against the rotary shaft 24 is configured of the brake shoe 18, the coil spring 22, and the hexagon socket set screw 20, and the frictional force adjustment portion 28 that adjusts the frictional force is configured of the hexagon socket set screw 20 with the hexagonal hole 2002.

Figure 1:
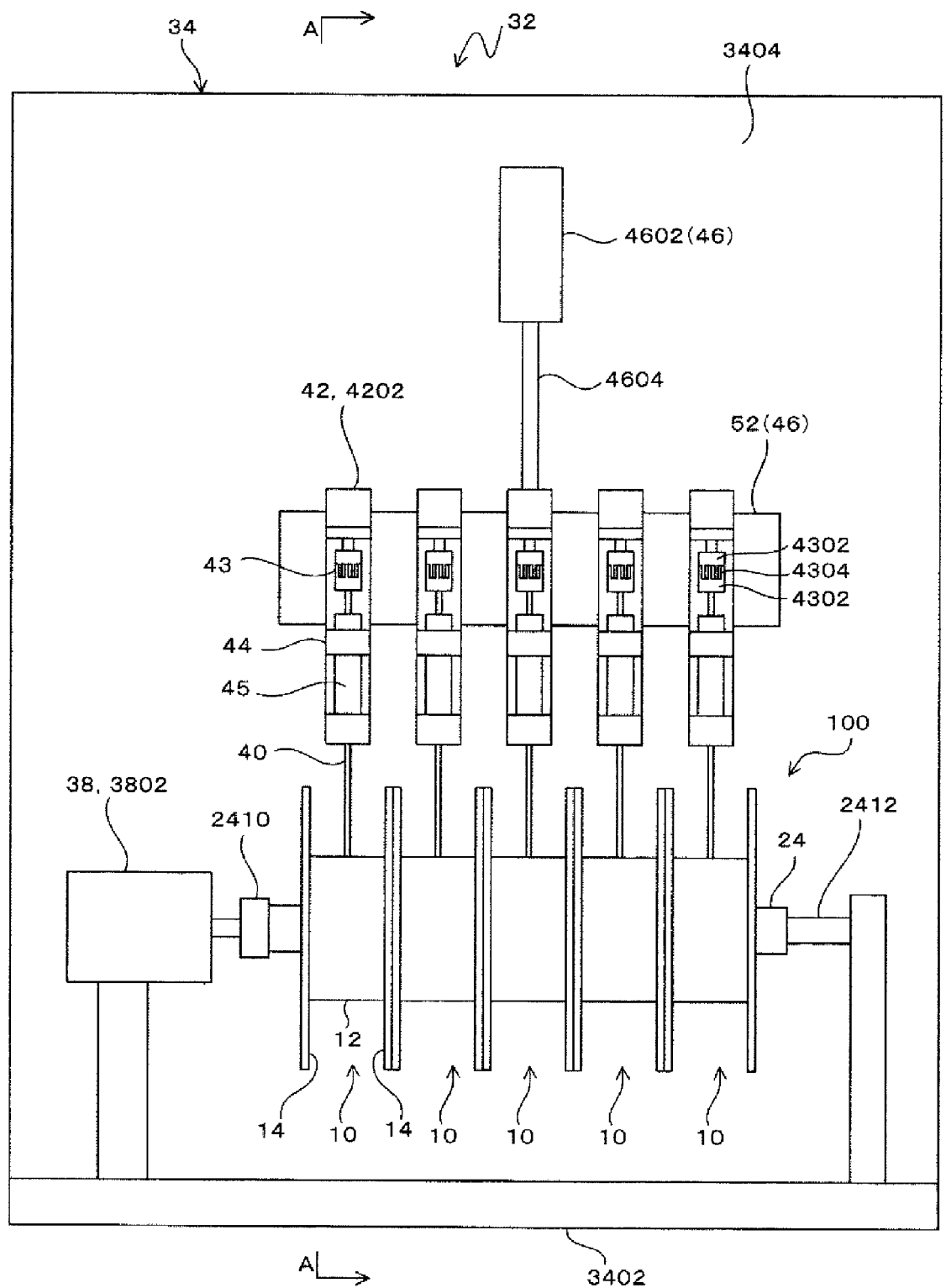
FIG. 1 is a front view of an adjustment device according to an embodiment.
Figure 2:
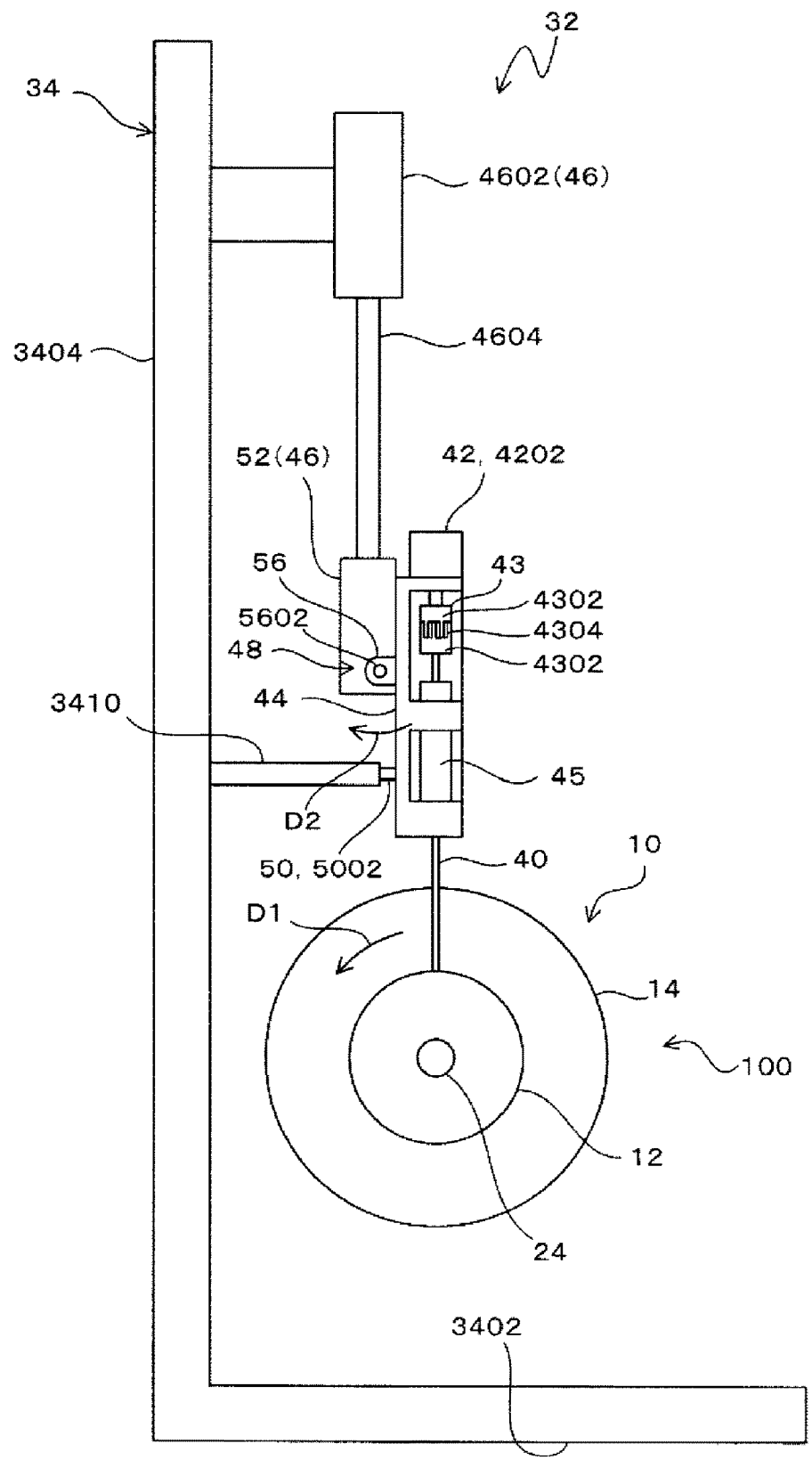
FIG. 2 is a cross-sectional view taken along line A-A in FIG. 1.
Figure 3:
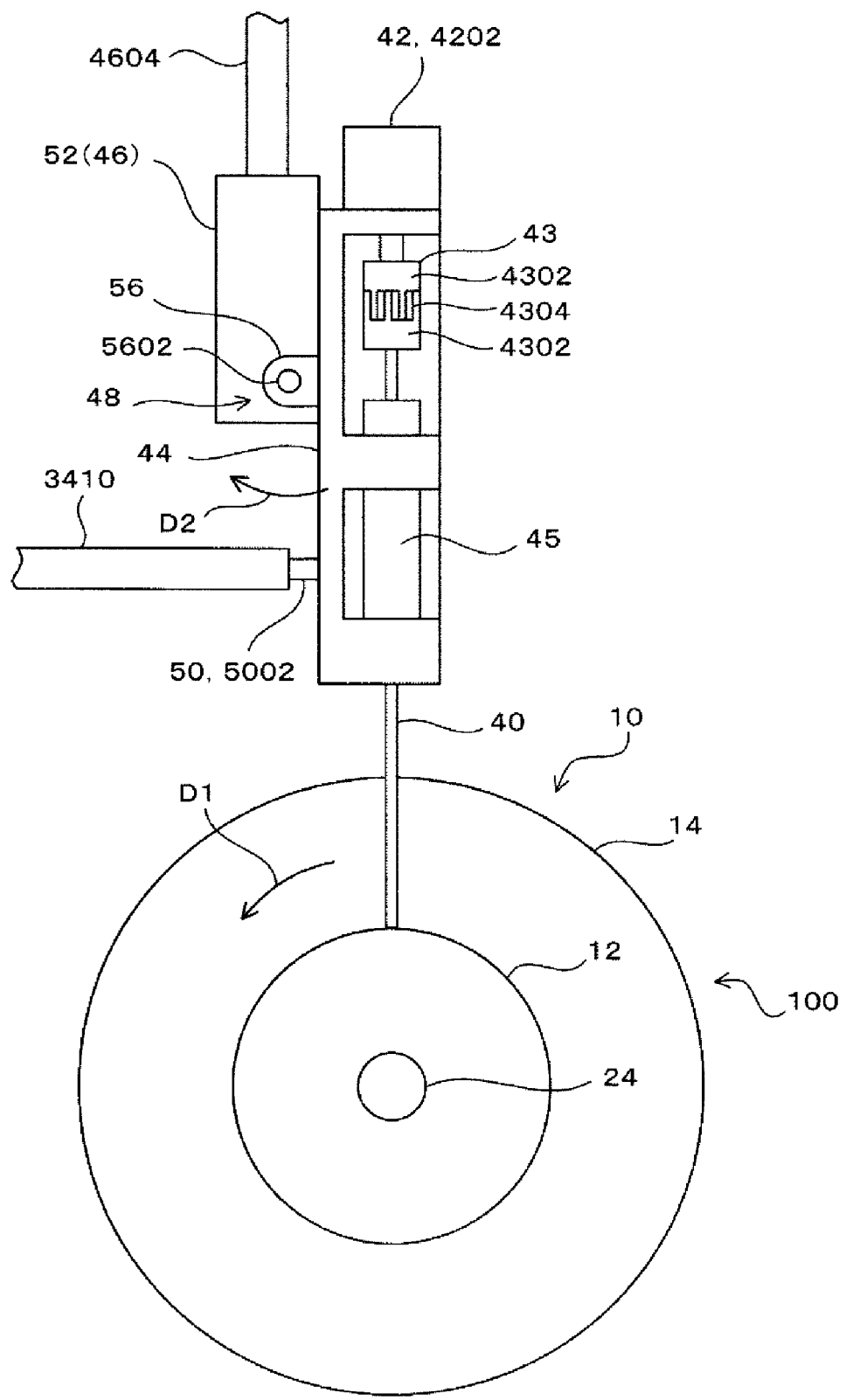
FIG. 3 is a side view illustrating a main part of the adjustment device according to the embodiment.

As illustrated in FIG. 1 to FIG. 3, the adjustment device 32 for the frictional force adjustment portion 28 of the section 10 (hereinafter referred to as the adjustment device 32) includes a frame 34, a positioning portion 36 (FIG. 4), a rotary shaft rotating actuator 38, an adjustment member 40, an adjustment member driving actuator 42, a support member 44, a movement mechanism 46, a tilt tolerance mechanism 48, and a pressure detection portion 50.

In the present embodiment, since the frictional force adjustment portions 28 of the five sections 10 of one bobbin 100 may be adjusted simultaneously, and the rotary shaft 24 is inserted through the support holes 1202 of the sections 10, the five sections 10 are supported on the rotary shaft 24, and the five adjustment members 40, the five adjustment member driving actuators 42, the five support members 44, and the five pressure detection portions 50 are provided in five sections 10.

In addition, one movement mechanism 46 is provided for the five sections 10.

As illustrated in FIG. 4, a washer 25, which is made of a material having a low coefficient of friction such as nylon, is disposed between the inner races 1602 of the adjacent sections 10 in the state where the five sections 10 are supported by the rotary shaft 24.

At one end of the rotary shaft 24, a washer 3602, which is made of a material having a small coefficient of friction such as nylon, is brought into contact with the inner race 1602 of the section 10 disposed at the one end using a stop ring 3604.

In addition, at the other end of the rotary shaft 24, a nylon washer 3606, which is made of a material having a small coefficient of friction, is brought into the contact with the inner races 1602 of the section 10 disposed at the other end via a metal washer 3608 and a nut 3610 threadedly engaged with a male screw on the end of the rotary shaft 24.

In this manner, the nylon washers 3602, 3606, the stop ring 3604, the metal washer 3608, and the nut 3610 constitute the positioning portion 36 that supports the inner circumferential portion of the section 10 supported by the rotary shaft 24 such that the section is immovable in the axial direction of the rotary shaft 24, which is advantageous for stably supporting the section 10 on the rotary shaft 24.

As illustrated in FIG. 1 and FIG. 2, the frame 34 includes a rectangular substrate 3402, and an erected plate 3404 erected upward from one side of the substrate 3402.

The rotary shaft 24 is provided on an upper surface of the substrate 3402.

One end of the rotary shaft 24 is detachably coupled to an output shaft of the rotary shaft motor 3802 via a coupling 2410, and the other end of the rotary shaft 24 is detachably coupled to a rotatable spindle 2412.

The spindle 2412 is movable to be close to and away from the end of the rotary shaft 24, and the spindle 2412 is moved to attach and detach the rotary shaft 24.

In the present embodiment, the rotary shaft motor 3802 constitutes the rotary shaft rotating actuator 38 that rotates the rotary shaft 24.

As described above, the five adjustment members 40, the five adjustment member driving actuators 42, and the five support members 44 are provided for the five respective sections 10, and are supported by the erected plate 3404.

Specifically, the adjustment members 40 and the adjustment member driving actuators 42 are supported by the support member 44, and the support member 44 is supported by the movement mechanism 46 via the tilt tolerance mechanism 48 supported by the erected plate 3404 so as to be movable upward and downward.

Figure 6A:
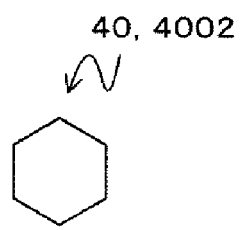
FIG. 6A is a plan view illustrating an adjustment member.
Figure 6B:
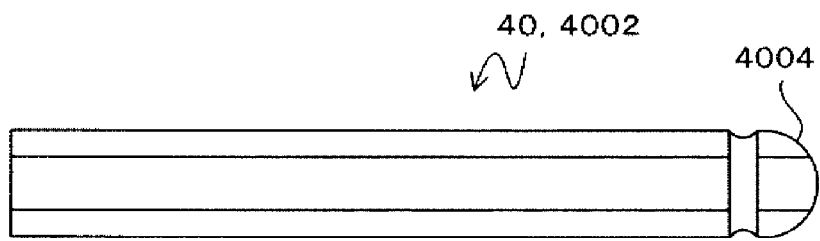
FIG. 6B is a front view illustrating the adjustment member.

As illustrated in FIGS. 6A and 6B, the adjustment member 40 is detachably coupled to the hexagonal hole 2002 of the hexagon socket set screw 20 constituting the frictional force adjustment portion 28 of the section 10 supported by the rotary shaft 24, causing the frictional force adjustment portion 28 to adjust the frictional force of the brake shoe 18 against the outer circumferential surface 2402 of the rotary shaft 24, and the adjustment member is configured of a hexagonal rod 4002 engageably coupled to the hexagonal hole 2002.

The hexagonal rod 4002 is sized to engage with the hexagonal hole 2002, and a spherical surface 4004 is formed on a tip of the hexagonal rod 4002 such that the hexagonal rod 4002 may swing within the hexagonal hole 2002.

Then, in the state where the tip of the hexagonal rod 4002 engages with the hexagonal hole 2002, the hexagonal rod 4002 is allowed to swing within a predetermined angle range using the tip of the hexagonal rod 4002 as a swing axis.

As illustrated in FIG. 1, FIG. 2, and FIG. 3, the adjustment member 40 is attached to the support member 44, and is inserted into a cylindrical internal space of a tubular member 45 with the axis being vertically oriented, thereby being rotatably supported by the tubular member 45.

The adjustment member driving actuator 42 rotates the adjustment member 40 normally and reversely, and is configured of an adjustment motor (electric motor) 4202 attached to the upper side of the support member 44.

An output shaft of the adjustment motor 4202 and the upper portion of the adjustment member 40 are rotatably and tiltably coupled to each other in an integral manner via a coupling 43, in which a star-shaped spider 4304 is interposed between opposed hubs 4302, and are configured to manually move the adjustment member 40 in the vertical direction.

In other words, the coupling 43 is attached to the output shaft of the adjustment motor 4202, and constitutes a coupling portion that rotatably couples the adjustment member 40 to the output shaft in an integral manner and supports adjustment member 40 so as to be movable in the longitudinal direction of the adjustment member 40.

By manually moving the adjustment member 40 in the vertical direction, the tip of the adjustment member 40 may be inserted into and removed from the hexagonal hole 2002 of the hexagon socket set screw 20 located within the screw hole 1206.

Note that, as described below, since the adjustment member 40 may be vertically moved via the movement mechanism 46 as described above, the output shaft of the adjustment motor 4202 may be directly coupled to the upper portion of the adjustment member 40 without using the coupling 43.

The movement mechanism 46 includes an air cylinder 4602 (moving actuator) and a movement member 52 attached to a tip of a rod 4604 of the air cylinder 4602.

In the present embodiment, the single air cylinder 4602 (moving actuator) and the single movement member 52 are provided.

A cylinder body of the air cylinder 4602 is supported by the erected plates 3404 with the axis being vertically oriented, and the support member 44 is coupled to the tip of the rod 4604 via the movement member 52 and a hinge mechanism 56.

Accordingly, the support member 44 is supported by the movement member 52 so as to be swingable about a support axis of the hinge mechanism 56.

When the movement member 52 and the support member 44 are lowered due to extension of the air cylinder 4602, the tip of the adjustment member 40 is positioned near the outer circumferential surface 2402 of the boss 12 in the section 10, such that the adjustment member 40 is detachably located with respect to the hexagonal hole 2002 of the hexagon socket set screw 20.

Note that when the coupling 43 is omitted, the air cylinder 4602 extends to engage the adjustment member 40 with the hexagonal hole 2002.

When the movement member 52 and the support member 44 raises due to contraction of the air cylinder 4602, the tip of the adjustment member 40 is located away from the outer side of the flange 14 of the section 10, such that the section 10 may be inserted into and removed from the adjustment device 32.

As illustrated in FIG. 2 and FIG. 3, the pressure detection portion 50 for measuring the frictional force of the brake shoe 18 against the outer circumferential surface 2402 of the rotary shaft 24 is sandwiched between the support member 44 and the erected plate 3404.

Specifically, an attachment member 3410 attached to the erected plate 3404 is provided as opposed to the support member 44, and the pressure detection portion 50 is attached to the attachment member 3410 in contact with the support member 44 or in the vicinity of the support member 44.

In the present embodiment, a load cell 5002 is used as the pressure detection portion 50, but various known stress sensors may be used as the pressure detection portion 50 as long as the stress sensors can detect the pressure generated between the support member 44 and the erected plate 3404.

The tilt tolerance mechanism 48 allows the adjustment member driving actuator 42 and the support member 44 to tilt due to the rotation of the rotary shaft 24 in the state where the adjustment member 40 engages with the frictional force adjustment portion 28.

That is, due to the frictional force of the brake shoe 18 against the outer circumferential surface 2402 of the rotary shaft 24, which is generated by the rotation of the rotary shaft 24, the section 10 rotates in the rotational direction of the rotary shaft 24.

As the section 10 rotates, the adjustment member 40 (hexagonal rod 4002) engaged with the hexagonal hole 2002 of the hexagon socket set screw 20 rotates about the rotary shaft 24 together with the rotary shaft 24 and the section 10.

According to the present technology, the tilt tolerance mechanism 48 may be formed of an arc-shaped guide that is provided on the erected plate 3404 and centered on the rotary shaft 24. Then, by coupling the movement mechanism 46 so as to be movable along the arc-shaped guide, the adjustment member 40, the adjustment member driving actuator 42, the support member 44, and the movement mechanism 46 are allowed to tilt due to the rotation of the rotary shaft 24.

However, the pressure for measuring the frictional force of the brake shoe 18 is reliably detected by the tilt within the small angle range of the adjustment member 40 (hexagonal rod 4002) and the support member 44.

Therefore, in the present embodiment, to reduce the size and weight of the tilt tolerance mechanism 48, when the rotary shaft 24 rotates in the state where the adjustment member 40 engages with the frictional force adjustment portion 28, the tilt tolerance mechanism 48 tilts the adjustment member 40, the adjustment member driving actuator 42, and the support member 44 without tilting the movement member 52.

The tilt tolerance mechanism 48 includes the hinge mechanism 56 that swingably couples the support member 44 to the movement member 52.

That is, when the section 10 is rotated in a direction indicated as an arrow D1 in FIG. 2 and FIG. 3 due to rotation of the rotary shaft 24, the adjustment member 40 (hexagonal rod 4002) is tilted within a predetermined angular range allowed within the hexagonal hole 2002, and the tilt of the adjustment member 40 (the hexagonal rod 4002) is allowed by swinging of the support member 44 about a shaft 5602 of the hinge mechanism 56 in a direction indicated as an arrow D2 with respect to the movement member 52.

A pressure for measuring the frictional force generated by the swinging of the support member 44 is detected by the pressure detection portion 50, and the pressure is reliably detected by the tilt of the adjustment member 40 (the hexagonal rod 4002) within the small slight angular range, in other words, is reliably detected by the swinging of the support member 44 in the small angular range.

By tilting only the support member 44 without tilting the movement mechanism 46, the size and weight of the tilt tolerance mechanism 48 may be reduced, which is advantageous for reducing the size and weight of the adjustment device 32.

Figure 9:
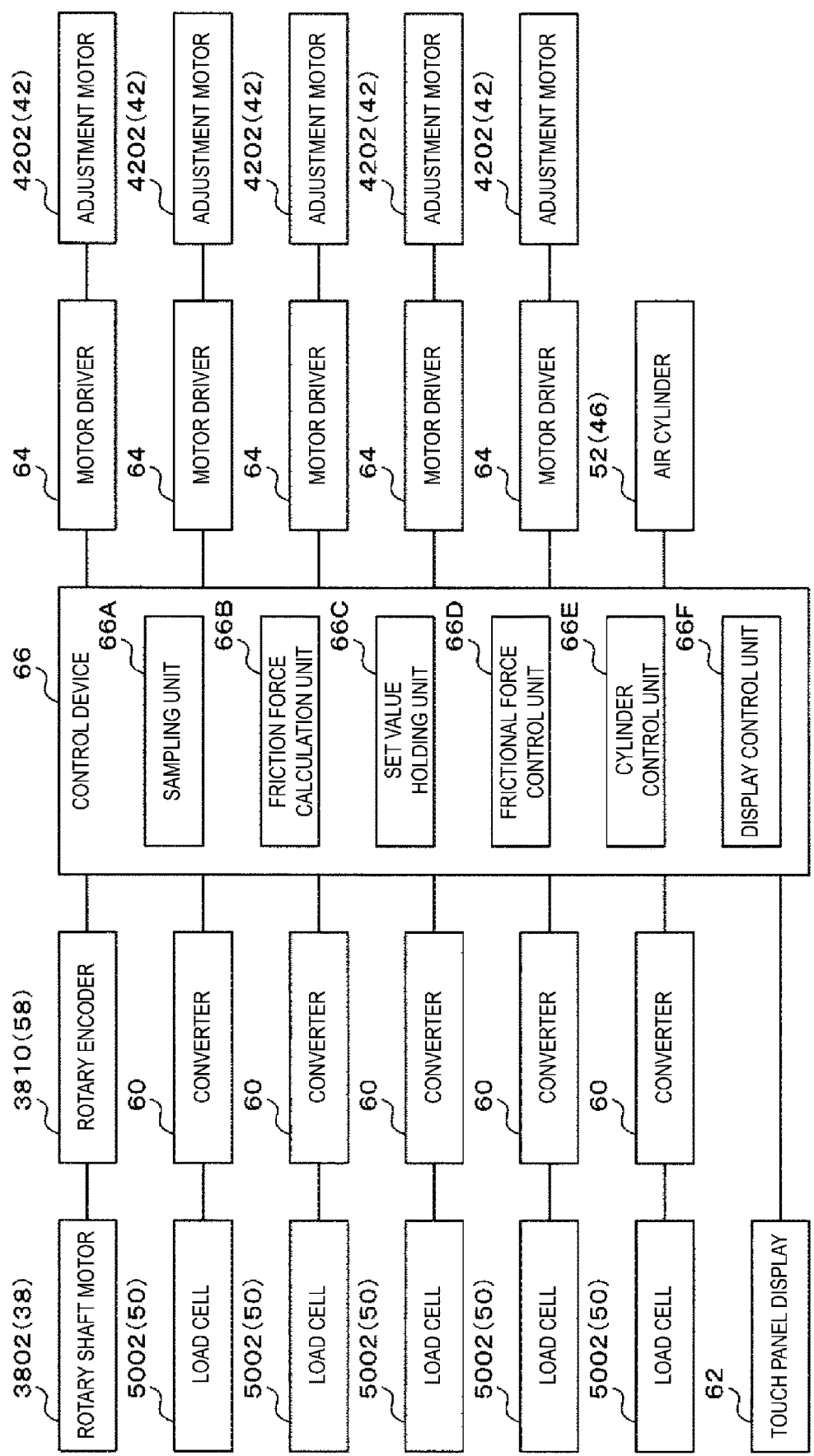
FIG. 9 is a block diagram illustrating the configuration of a control system.

Next, the configuration of a control system will be described with reference to FIG. 9.

In addition to the components described above, the adjustment device 32 includes a rotary encoder 3810, a converter 60, a touch panel display 62, a motor driver 64, and a control device 66.

The rotary encoder 3810 detects a rotation amount (rotation angle) of the rotary shaft motor 3802 and supplies the detected rotation amount to the control device 66, and constitutes a rotation amount detection portion 58.

The converter 60 is provided for each load cell 5002, amplifies a load cell signal output from the load cell 5002, converts the amplified signal into a detection signal composed of a DC voltage signal, and supplies the converted signal to the control device 66.

The touch panel display 62 is connected to the control device 66, and inputs below-mentioned frictional force set value and various operation information to the control device 66 by a touch operation, or displays information from the control device 66.

The touch panel display 62 serves to input the frictional force to be generated by the frictional force generation portion 26 to the control device 66, and specifically inputs a target value of the frictional force and a tolerance value for the target value.

For example, if the target frictional force is F1 and the tolerance is ±ΔF, the target frictional force range, that is, the set value range is a range of not less than (F1−ΔF) and not greater than (F1+ΔF).

In addition, the touch panel display 62 displays values of the frictional force calculated by the control device 66 for each of the sections 10, according to the detection signal of the load cell 5002.

The motor driver 64 is provided for each adjustment motor 4202, and controls the rotation amount of the adjustment motor 4202 according to a control signal from the control device 66.

The control device 66 is configured of a programmable logic controller (PLC) or a computer, and includes a CPU (central processing unit), a ROM (read only memory) that stores a control program, a RAM (random access memory) that is a work area for the control program, an EEPROM (electrically erasable programmable read only memory) that holds various types of rewritable data, an interface unit that interfaces with peripheral circuits, and the like.

The CPU in the control device 66 executes the above-mentioned control program to function as a sampling unit 66A, a frictional force calculation unit 66B, a set value holding unit 66C, a frictional force control unit 66D, a cylinder control unit 66E, and a display control unit 66F.

The sampling unit 66A samples and stores the pressure detected by the pressure detection portion 50, that is, the pressure detected from each load cell 5002 via the converter 60, at a predetermined sampling cycle.

The frictional force calculation unit 66B calculates the frictional force in the frictional force generation portion 26 from the pressure detected by the pressure detection portion 50.

In the present embodiment, each time the rotation amount of the rotary shaft 24, which is detected by the rotation amount detection portion 58, becomes a predetermined rotation amount, the frictional force calculation unit 66B calculates the frictional force in the frictional force generation portion 26 based on an average value of the pressure sampled by the sampling unit 66A during the period corresponding to the rotation amount.

The frictional force may be calculated without such averaging, but in this case, the frictional force greatly varies, decreasing the accuracy of the resulting frictional force.

In contrast, in the present embodiment, by calculating the frictional force based on the average value of the pressure sampled for a period during which the rotary shaft 24 rotates by a predetermined rotation amount, the frictional force may be accurately obtained with little variation, which is advantageous for accurately adjusting the frictional force by the frictional force control unit 66D.

Note that the predetermined rotation amount is preferably at least one rotation. The reason is as follows: when the rotary shaft 24 makes one rotation, the brake shoe 18 is pressure over the entire circumference of the outer circumferential surface 2402 of the rotary shaft 24, and the average value of the frictional pressure can be obtained taking into account the state of the outer circumferential surface 2402 of the rotary shaft 24, which is advantageous for accurately obtaining the frictional force with little variation to adjust the frictional force by the frictional force control unit 66D with high accuracy.

The set value holding unit 66C receives and stores a set value within the target frictional force range input via the touch panel display 62.

The frictional force control unit 66D controls the adjustment motor 4202, which is the adjustment member driving actuator 42, via the motor driver 64 such that the frictional force calculated by the frictional force calculation unit 66B becomes the set value (falls within the predetermined range).

The cylinder control unit 66E moves the air cylinder 4602 to an upper position or a lower position according to the operational input on the touch panel display 62.

The display control unit 66F causes the touch panel display 62 to display various information indicating the frictional force calculated by the frictional force calculation unit 66B and the operational state of the adjustment device 32 thereon.

Figure 10:
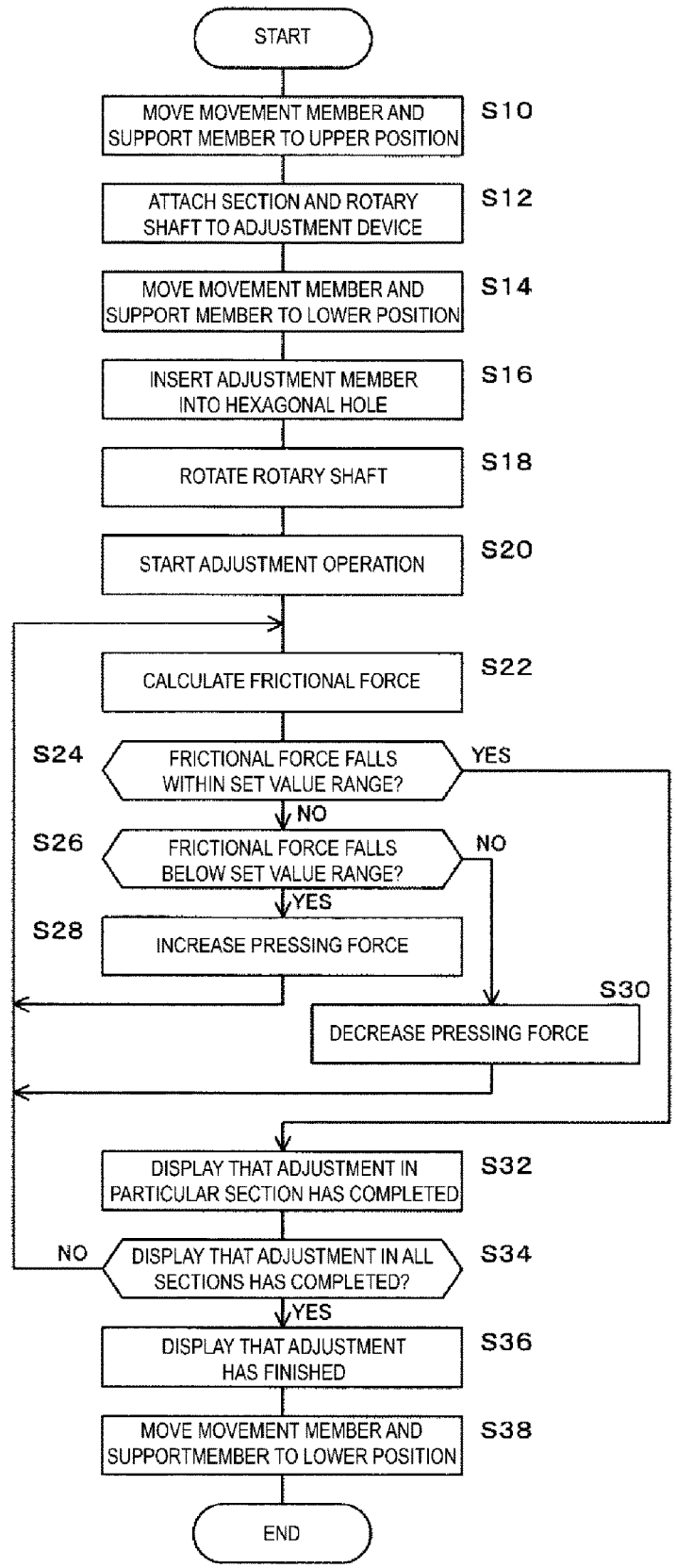
FIG. 10 is a flowchart illustrating operations of the adjustment device.

Next, operations of the adjustment device 32 will be described with reference to a flowchart in FIG. 10.

It is assumed that the set value of the frictional force is previously held in the set value holding unit 66C.

First, the touch panel display 62 is operated to cause the air cylinder 4602 to move the movement member 52 and the support member 44 to the upper position (Step S10: cylinder control unit 66E).

Next, the rotary shaft 24 to which the section 10 is assembled is prepared, and one end of the rotary shaft 24 is coupled to the output shaft of the rotary shaft motor 3802 via the coupling 2410, and the other end of the rotary shaft 24 is coupled to the spindle 2412 (Step S12).

Next, the touch panel display 62 is operated to cause the air cylinder 4602 to move the movement member 52 and the support member 44 to the lower position (Step S14: cylinder control unit 66E).

Next, when each section 10 has been manually rotated to position the screw hole 1206 of the boss 12 as opposed to the tip of the adjustment member 40, the tip of the adjustment member 40 is inserted into the hexagonal hole 2002 of the hexagon socket set screw 20 located in the screw hole 1206 (Step S16).

Next, the rotary shaft motor 3802 is powered-on to rotate the rotary shaft 24 (Step S18).

The touch panel display 62 is operated to initiate the adjustment operation of the control device 66 (Step S20).

Note that following operations are performed concurrently in the plurality of sections 10 in parallel.

Each time the rotation amount of the rotary shaft 24, which is detected by the rotation amount detection portion 58, becomes the predetermined rotation amount, the frictional force calculation unit 66B calculates the frictional force in the frictional force generation portion 26 based on the average value of the pressure sampled by the sampling unit 66A for the period corresponding to the rotation amount (Step S22).

The frictional force control unit 66D determines whether or not the calculated frictional force falls within the set value range (Step S24).

When the frictional force does not fall within the set value range, it is determined to whether or not the frictional force falls below the set value range (Step S26).

When it is determined that the frictional force falls below the set value range, the frictional force control unit 66D controls the rotation amount of the adjustment motor 4202 by a predetermined amount so as to increase the pressing force of the brake shoe 18 against the outer circumferential surface 2402 of the rotary shaft 24, to rotate the hexagon socket set screw 20 (Step S28), and the processing returns to Step S22.

When it is determined that the frictional force does not fall below, that is, exceeds the set value range, the frictional force control unit 66D controls the rotation amount of the adjustment motor 4202 by a predetermined amount so as to decrease the pressing force of the brake shoe 18 against the outer circumferential surface 2402 of the rotary shaft 24, to rotate the hexagon socket set screw 20 (Step S30), and the processing returns to Step S22.

When the frictional force falls within the set value range in Step S24, the display control unit 66F causes the touch panel display 62 to display that the operation of adjusting the frictional force in the section 10 has been completed (Step S32).

The display control unit 66F determines whether or not the operation of adjusting the frictional force in all of the sections 10 has been completed (Step S34), and when the answer is negative, the processing returns to Step S22, and when the answer is affirmative, the touch panel display 62 displays that the operation of adjusting the frictional force in all of the sections 10 has been completed (Step S36).

Next, the cylinder control unit 66E causes the air cylinder 4602 to move the movement member 52 and the support member 44 from the lower position to the upper position (Step S38).

This terminates the adjustment operation.

As described above, in the present embodiment, since the adjustment member driving actuator 42 is controlled such that the frictional force in the frictional force generation portion 26 in the section 10 falls within the predetermined range, the adjustment of the frictional force adjustment portion 28 may be automatically made in a short time.

Accordingly, the complicated a complicated manual adjustment operation of the adjustment member 40 is unnecessary, thereby improving the efficiency of the adjustment of the frictional force against the rotary shaft 24 in the section 10, which is advantageous for reducing manufacturing costs of the hose.

In addition, in the present embodiment, since the frictional force in the frictional force generation portions 26 in the plurality of sections 10 are adjusted simultaneously, the frictional force against the rotary shaft 24 in the plurality of sections 10 may be automatically adjusted in a short time. This is more advantageous for improving the efficiency of the adjustment of the frictional force adjustment portion 28, which is more advantageous for reducing manufacturing costs of the hose.

For example, in the present embodiment, the frictional force of the bobbin 100 having five sections 10 is adjusted in approximately one minute. For example, even when 180 bobbins 100 are attached to a spiral machine, that is, 900 sections 10 are attached, the frictional force may be adjusted for 180 minutes for specifications of each rubber hose, to greatly reduce the adjustment time as compared to the conventional manual adjustment, which is extremely advantageous for reducing manufacturing costs of the hose.

In addition, in the present embodiment, since the tilt tolerance mechanism 48 that allows the support member 44 to tilt due to the rotation of the rotary shaft 24 in the state where the adjustment member 40 engages with the frictional force adjustment portion 28, as compared to the case where the adjustment member 40, the adjustment member driving actuator 42, the support member 44, and the movement mechanism 46 are tilted due to the rotation of the rotary shaft 24, the size and weight of the tilt tolerance mechanism 48 may be reduced, which is advantageous for reducing the size and weight of the adjustment device 32.

In addition, in the present embodiment, by calculating the frictional force based on the average value of the pressure sampled for the period during which the rotary shaft 24 rotates by the predetermined rotation amount, the frictional force may be accurately obtained with little variation, which is advantageous for accurately adjusting the frictional force by the frictional force control unit 66D.

Note that in the present embodiment, the adjustment member 40 is constituted of the hexagonal rod 4002, and the hexagonal hole 2002 is formed in the hexagon socket set screw 20.

However, the shape of the tip of the adjustment member 40 and the shape of the hole and groove of the hexagon socket set screw 20 are not limited, and for example, the tip of the adjustment member 40 may be shaped like a Phillip screwdriver a slotted screwdriver, and the hexagon socket set screw 20 may be provided with a plus-shaped groove or a minus-shaped groove.

In short, as long as the shape of the tip of the adjustment member 40 coincides the shape of the hole or groove of the hexagon socket set screw 20, various known shapes of the tip the adjustment member 40 and the hole or groove pf the hexagon socket set screw 20 may be adopted.

In addition, in the present embodiment, the block-like brake shoe 18 constitutes the frictional force generation portion 26. However, a band-like brake shoe may be pressed against the outer circumferential surface of the rotary shaft 24, and the pressing force may be adjusted to constitute the frictional force generation portion 26. The structure of the frictional force generation portion 26 is not limited to the embodiment, and various known structures can be employed.

Further, the structure of the frictional force adjustment portion 28 is also appropriately changed according to the structure of the frictional force generation portion 26, and the structure of the frictional force adjustment portion 28 is also not limited to the embodiment.

The invention claimed is:

1. An adjustment device for a frictional force adjustment portion in a section, the section including an inner circumferential portion provided with a support hole, a frictional force generation portion that generates a frictional force against a rotary shaft inserted through the support hole, and the frictional force adjustment portion that adjusts the frictional force in the frictional force generation portion, and an outer circumferential portion provided with a wire winding portion around which a wire is wound, the adjustment device comprising:
    a rotary shaft rotating actuator that rotates the rotary shaft;
    an adjustment member that is detachably coupled to the frictional force adjustment portion of the section supported by the rotary shaft and enables the frictional force adjustment portion to adjust the frictional force;
    an adjustment member driving actuator that drives the adjustment member in a direction of adjusting the frictional force;
    a support member that supports the adjustment member and the adjustment member driving actuator;
    a movement mechanism that moves the support member in a direction in which the support member is detachably coupled to the frictional force adjustment portion;
    a tilt tolerance mechanism that allows the support member to tilt due to rotation of the rotary shaft in a state where the adjustment member engages with the frictional force adjustment portion;
    a pressure detection portion that detects a pressure received from the support member at the tilting;
    a frictional force calculation unit that calculates the frictional force in the frictional force generation portion from the pressure detected by the pressure detection portion; and
    a frictional force control unit that controls the adjustment member driving actuator such that the frictional force calculated by the frictional force calculation unit falls within a predetermined range.

2. The adjustment device for the frictional force adjustment portion of the section according to claim 1, wherein
    the movement mechanism includes a moving actuator and a movement member moved away from and close to the rotary shaft by the moving actuator, and
    the tilt tolerance mechanism includes a hinge mechanism that swingably couples the support member to the movement member.

3. The adjustment device for the frictional force adjustment portion of the section according to claim 2, wherein
    a plurality of sections is provided on the rotary shaft,
    a plurality of the rotary shaft rotating actuators, a plurality of the adjustment members, a plurality of the adjustment member driving actuators, a plurality of the support members, a plurality of the pressure detection portions, a plurality of the frictional force calculation units, and a plurality of the frictional force control units are provided for the respective sections,
    the single moving actuator and the single movement member are provided,
    the moving actuator has an extendable rod,
    the movement member is attached to a tip of the rod, and
    a plurality of the support members are each swingably coupled to the movement member via the hinge mechanism.

4. The adjustment device for frictional force adjustment portion of the section according to claim 3, further comprising a positioning portion that supports the inner circumferential portion of the section supported by the rotary shaft such that the section is immovable in an axial direction of the rotary shaft.

5. The adjustment device for the frictional force adjustment portion of the section according to claim 4, wherein
    the adjustment member driving actuator is an electric motor, and
    the adjustment device further comprises a coupling portion attached to an output shaft of the electric motor, the coupling portion being rotatable integrally with the output shaft and supporting the adjustment member such that the adjustment member is movable in a longitudinal direction of the adjustment member.

6. The adjustment device for the frictional force adjustment portion of the section according to claim 5, further comprising:
    a rotation amount detection portion that detects a rotation amount of the rotary shaft; and
    a sampling unit that sample and stores the pressure detected by the pressure detection portion, wherein
    each time the rotation amount detected by the rotation amount detection portion becomes a predetermined rotation amount, the frictional force calculation unit calculates the frictional force based on an average value of the pressure sampled by the sampling unit for a period corresponding to the rotation amount.

7. The adjustment device for the frictional force adjustment portion of the section according to claim 6, wherein
    the predetermined rotation amount is at least one rotation.

8. The adjustment device for frictional force adjustment portion of the section according to claim 1, further comprising a positioning portion that supports the inner circumferential portion of the section supported by the rotary shaft such that the section is immovable in an axial direction of the rotary shaft.

9. The adjustment device for the frictional force adjustment portion of the section according to claim 1, wherein
    the adjustment member driving actuator is an electric motor, and
    the adjustment device further comprises a coupling portion attached to an output shaft of the electric motor, the coupling portion being rotatable integrally with the output shaft and supporting the adjustment member such that the adjustment member is movable in a longitudinal direction of the adjustment member.

10. The adjustment device for the frictional force adjustment portion of the section according to claim 1, further comprising:
a rotation amount detection portion that detects a rotation amount of the rotary shaft; and
a sampling unit that sample and stores the pressure detected by the pressure detection portion, wherein
each time the rotation amount detected by the rotation amount detection portion becomes a predetermined rotation amount, the frictional force calculation unit calculates the frictional force based on an average value of the pressure sampled by the sampling unit for a period corresponding to the rotation amount.

11. The adjustment device for the frictional force adjustment portion of the section according to claim 10, wherein the predetermined rotation amount is at least one rotation.

* * * * *